United States Patent
Yang et al.

(10) Patent No.: US 9,924,474 B2
(45) Date of Patent: Mar. 20, 2018

(54) SCHEME OF FINITE POWER TRANSMISSION STATUSES FOR LOW COST WIRELESS BROADBAND COMMUNICATION SYSTEM

(71) Applicant: INTEL IP CORPORATION, Santa Clara, CA (US)

(72) Inventors: Rongzhen Yang, Shanghai (CN); Po-Kai Huang, Santa Clara, CA (US); Hujun Yin, Saratoga, CA (US); Robert Stacey, Portland, OR (US); Yongsen Ma, Williamsburg, VA (US); Peng Meng, Shanghai (CN)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 15/501,385

(22) PCT Filed: Sep. 18, 2014

(86) PCT No.: PCT/CN2014/086781
§ 371 (c)(1),
(2) Date: Feb. 2, 2017

(87) PCT Pub. No.: WO2016/041166
PCT Pub. Date: Mar. 24, 2016

(65) Prior Publication Data
US 2017/0238265 A1 Aug. 17, 2017

(51) Int. Cl.
*H04W 52/24* (2009.01)

(52) U.S. Cl.
CPC ....... *H04W 52/243* (2013.01); *H04W 52/241* (2013.01); *H04W 52/242* (2013.01)

(58) Field of Classification Search
CPC ............. H04W 52/243; H04W 52/241; H04W 52/242
(Continued)

(56) References Cited

U.S. PATENT DOCUMENTS

| | | | | |
|---|---|---|---|---|
| 5,225,667 A | * | 7/1993 | Furuta | G06K 7/0008 235/380 |
| 6,118,767 A | * | 9/2000 | Shen | H04B 1/7097 370/252 |

(Continued)

FOREIGN PATENT DOCUMENTS

| | | |
|---|---|---|
| CN | 102404837 A | 4/2012 |
| CN | 103052148 A | 4/2013 |

(Continued)

OTHER PUBLICATIONS

International Search Report for corresponding International Application No. PCT/CN2014/086781, dated Jun. 18, 2015.
(Continued)

*Primary Examiner* — Hai V Nguyen
(74) *Attorney, Agent, or Firm* — Jason H. Vick; Sheridan Ross, PC

(57) ABSTRACT

Some wireless communications environments, such as Wi-Fi, may include inexpensive power amplifiers where the power adjustment may not be accurate, and may also include pathloss measurement errors that are high enough to degrade performance of a power control algorithm. To address this issue, an exemplary aspect is directed toward a finite state power control algorithm and technique that, while designed for next generation Wi-Fi standards, such as 802.11ax, can in general be used with any wireless communication protocol or standard.

22 Claims, 3 Drawing Sheets

(58) Field of Classification Search
USPC .................................................. 455/522, 69
See application file for complete search history.

(56) References Cited

U.S. PATENT DOCUMENTS

| | | | | |
|---|---|---|---|---|
| 6,414,955 | B1* | 7/2002 | Clare | H04L 41/12 370/390 |
| 6,631,124 | B1* | 10/2003 | Koorapaty | H04B 7/2618 370/335 |
| 6,643,322 | B1* | 11/2003 | Varma | H04L 1/0002 340/3.1 |
| 6,647,068 | B2* | 11/2003 | Tzannes | H04L 5/1438 375/222 |
| 7,272,171 | B2* | 9/2007 | Tzannes | H04L 5/1438 375/222 |
| 7,310,380 | B1* | 12/2007 | Young | H04L 25/0212 375/295 |
| 7,508,657 | B1* | 3/2009 | Smith | G06F 1/1601 361/679.24 |
| 7,577,411 | B2* | 8/2009 | Chang | H04B 1/18 455/125 |
| 7,965,835 | B2* | 6/2011 | Park | G06F 1/1616 379/433.13 |
| 8,095,643 | B2* | 1/2012 | Goto | H04L 41/12 370/216 |
| 8,156,353 | B2* | 4/2012 | Tsai, Jr. | G06F 1/3209 370/231 |
| 8,271,047 | B2* | 9/2012 | Kim | G06F 1/1615 345/156 |
| 8,472,886 | B2* | 6/2013 | Haas | H04W 52/10 370/329 |
| 8,676,192 | B2* | 3/2014 | Jalali | H01Q 1/2291 455/432.1 |
| 8,866,840 | B2* | 10/2014 | Dahl | G06F 1/1616 345/1.3 |
| 8,933,874 | B2* | 1/2015 | Lundqvist | G06F 1/1616 345/1.3 |
| 9,008,584 | B2* | 4/2015 | Alexander | G01S 13/003 340/552 |
| 9,176,956 | B2* | 11/2015 | Kim | G06F 17/30023 |
| 9,295,006 | B2* | 3/2016 | Jalali | H01Q 1/2291 |
| 9,319,172 | B2* | 4/2016 | Jalali | H04L 1/0001 |
| 9,607,169 | B2* | 3/2017 | You | G06F 21/6218 |
| 9,686,655 | B2* | 6/2017 | Oh | H04B 7/0452 |
| 9,698,843 | B2* | 7/2017 | Alexander | H04B 1/1081 |
| 2002/0186704 | A1* | 12/2002 | Tzannes | H04L 5/1438 370/441 |
| 2003/0016174 | A1* | 1/2003 | Anderson | G01S 5/02 342/378 |
| 2003/0086366 | A1* | 5/2003 | Branlund | H04B 1/71052 370/208 |
| 2004/0104898 | A1* | 6/2004 | Badarneh | G06F 1/1626 345/169 |
| 2005/0032542 | A1* | 2/2005 | Wilborn | H04W 36/0088 455/525 |
| 2005/0272458 | A1* | 12/2005 | Sakoda | H04W 52/58 455/522 |
| 2007/0103382 | A1* | 5/2007 | Chang | H04B 1/38 345/1.1 |
| 2007/0118671 | A1* | 5/2007 | Ganti | G06F 1/1616 710/1 |
| 2007/0197252 | A1 | 8/2007 | Watanabe et al. | |
| 2007/0238416 | A1* | 10/2007 | Williams | A61N 1/08 455/67.11 |
| 2010/0011291 | A1* | 1/2010 | Nurmi | G06F 3/0414 715/702 |
| 2010/0085382 | A1* | 4/2010 | Lundqvist | G06F 1/1616 345/659 |
| 2010/0085697 | A1* | 4/2010 | Park | G06F 1/1616 361/679.27 |
| 2011/0003611 | A1* | 1/2011 | Haas | H04W 52/10 455/512 |
| 2011/0053628 | A1* | 3/2011 | Kim | H04B 7/18539 455/509 |
| 2011/0149773 | A1* | 6/2011 | Lee, II | H03G 3/3078 370/252 |
| 2011/0205118 | A1* | 8/2011 | Ojard | H01Q 25/00 342/373 |
| 2011/0211622 | A1* | 9/2011 | Wang | H04B 7/0408 375/220 |
| 2011/0216064 | A1* | 9/2011 | Dahl | G06F 1/1616 345/428 |
| 2011/0274205 | A1* | 11/2011 | Lee, II | H04B 7/0413 375/295 |
| 2012/0083203 | A1* | 4/2012 | Truong | H04W 52/46 455/10 |
| 2012/0113942 | A1* | 5/2012 | Kim | H04L 1/1861 370/329 |
| 2012/0142291 | A1* | 6/2012 | Rath | H04B 7/0602 455/127.1 |
| 2012/0196541 | A1* | 8/2012 | Alexander | G01S 13/003 455/67.11 |
| 2013/0010704 | A1 | 1/2013 | Kronquist et al. | |
| 2013/0062828 | A1* | 3/2013 | Cube-Sherman | A63F 9/0876 273/153 S |
| 2013/0094491 | A1 | 4/2013 | Sun et al. | |
| 2013/0107791 | A1* | 5/2013 | Oh | H04B 7/0452 370/312 |
| 2013/0114660 | A1* | 5/2013 | Alexander | H04B 1/1081 375/226 |
| 2013/0135182 | A1* | 5/2013 | Jung | G09G 3/00 345/30 |
| 2015/0139111 | A1* | 5/2015 | Fodor | H04W 52/12 370/329 |
| 2015/0146767 | A1* | 5/2015 | Kerpez | H04L 25/03828 375/227 |
| 2015/0254471 | A1* | 9/2015 | You | G06F 21/6218 726/19 |
| 2015/0333854 | A1* | 11/2015 | Yang | H04W 24/08 370/252 |
| 2017/0083019 | A1* | 3/2017 | Knoblach | G05D 1/0055 |
| 2017/0160741 | A1* | 6/2017 | Knoblach | G05D 1/0055 |

FOREIGN PATENT DOCUMENTS

| | | |
|---|---|---|
| CN | 103379608 A | 10/2013 |
| CN | 103874179 A | 6/2014 |
| WO | WO 2015/127777 | 9/2015 |

OTHER PUBLICATIONS

Written Opinion for corresponding International Application No. PCT/CN2014/086781, dated Jun. 18, 2015.
International Preliminary Report on Patentability for corresponding International Application No. PCT/CN2014/086781, dated Mar. 30, 2017.
Office Action and Search Report for Taiwan Patent Application No. 104125650, dated Mar. 8, 2017.
Notice of Allowance (Including Translation) for Taiwan Patent Application No. 104125650, dated Jul. 25, 2017.

* cited by examiner

SCHEME OF FINITE POWER TRANSMISSION STATUSES FOR LOW COST WIRELESS BROADBAND COMMUNICATION SYSTEM

CROSS-REFERENCE TO RELATED APPLICATIONS

This application is a national stage application under 35 U.S.C 371 of PCT Application No. PCT/CN2014/086781, filed 18 Sep. 2014, which designated the United States, which PCT application is incorporated herein by reference in its entirety.

TECHNICAL FIELD

An exemplary aspect is directed toward communications systems. More specifically an exemplary aspect is directed toward wireless communications systems and even more specifically to power control in wireless communications systems.

BACKGROUND

Wireless networks are ubiquitous and are commonplace indoors and becoming more frequently installed outdoors. Wireless networks transmit and receive information utilizing varying techniques. For example, but not by way of limitation, two common and widely adopted techniques used for communication are those that adhere to the Institute for Electronic and Electrical Engineers (IEEE) 802.11 standards such as the 802.11n standard and the IEEE 802.11ac standard.

The 802.11 standard specifies a common Medium Access Control (MAC) Layer which provides a variety of functions that support the operation of 802.11-based wireless LANs (WLANs). The MAC Layer manages and maintains communications between 802.11 stations (such as between radio network cards (NIC) in a PC or other wireless devices or stations (STA) and access points (APs)) by coordinating access to a shared radio channel and utilizing protocols that enhance communications over a wireless medium.

802.11n was introduced in 2009 and improved the maximum single-channel data rate from 54 Mbps of 802.11g to over 100 Mbps. 802.11n also introduced MIMO (multiple input/multiple output or spatial streaming), where, according to the standard, up to 4 separate physical transmit and receive antennas carry independent data that is aggregated in a modulation/demodulation process in the transceiver. (Also known as SU-MIMO (single-user multiple input/multiple output.))

The IEEE 802.11ac specification operates in the 5 GHz band and adds channel bandwidths of 80 MHz and 160 MHz with both contiguous and non-contiguous 160 MHz channels for flexible channel assignment. 802.11ac also adds higher order modulation in the form of 256 quadrature amplitude modulation (QAM), providing a 33-percent improvement in throughput over 802.11n technologies. A further doubling of the data rate in 802.11ac is achieved by increasing the maximum number of spatial streams to eight.

IEEE 802.11ac further supports multiple concurrent downlink transmissions ("multi-user multiple-input, multiple-output" (MU-MIMO)), which allows transmission to multiple spatial streams to multiple clients simultaneously. By using smart antenna technology, MU-MIMO enables more efficient spectrum use, higher system capacity and reduced latency by supporting up to four simultaneous user transmissions. This is particularly useful for devices with a limited number of antennas or antenna space, such as smartphones, tablets, small wireless devices, and the like. 802.11ac streamlines the existing transmit beamforming mechanisms which significantly improves coverage, reliability and data rate performance.

IEEE 802.11ax is the successor to 802.11ac and is proposed to increase the efficiency of WLAN networks, especially in high density areas like public hotspots and other dense traffic areas. 802.11ax will also use orthogonal frequency-division multiple access (OFDMA). Related to 802.11ax, the High Efficiency WLAN Study Group (HEW SG) within the IEEE 802.11 working group is considering improvements to spectrum efficiency to enhance system throughput per area in high density scenarios of APs (Access Points) and/or STAs (Stations).

In current wireless broadband communications standards and systems development, transmission power control protocols have played a key role for interference mitigation and system performance improvement. These interference mitigation and system perform improvements have been designed and included as an essential part of the key wireless communications standards, such as 3GPP LTE, IEEE 802.16, and the like.

However, many cost sensitive wireless broadband communications systems, such as Wi-Fi and 802.11, have the following requirements:

1) A low cost power amplifier is strongly preferred. However, with low cost power amplifiers, power adjustment may not be able to be accurately controlled.

2) Due to the low cost of the system, pathloss measurement errors in Wi-Fi may reach 5 to 10dB—which may greatly degrade the performance of the conventional power control algorithms' gain.

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

Figure 1:
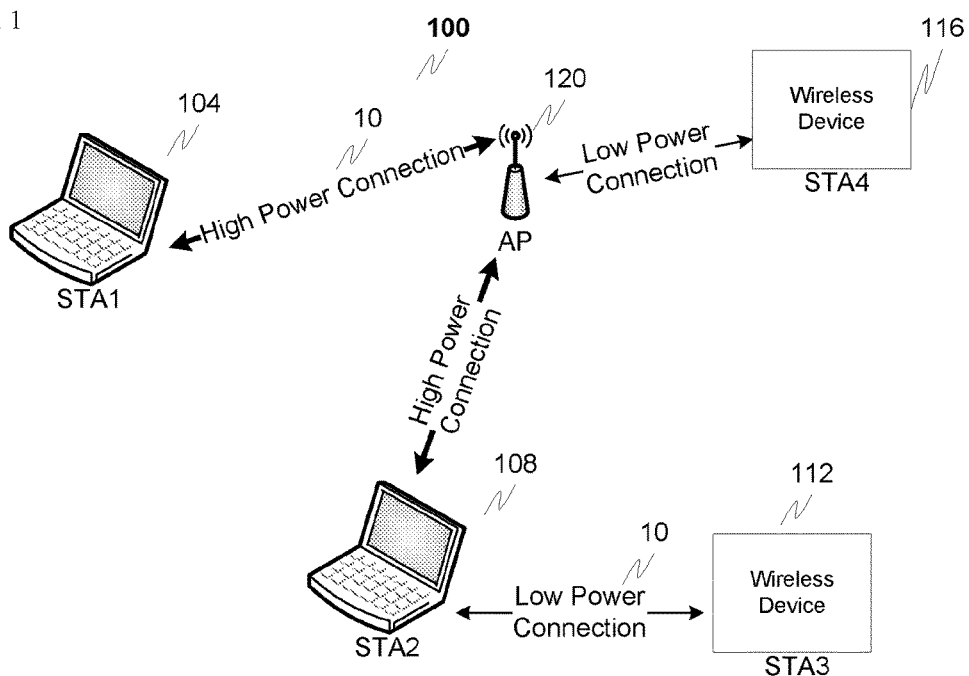
FIG. 1 illustrates an exemplary communications environment.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB (Management Information Base), a network operation or management device, a transceiver(s), a station, an access point(s), or some combination thereof. Similarly, one or more of the functional portions of the system could be distributed between a transceiver and an associated computing device/system.

Furthermore, it should be appreciated that the various links 5, including the communications channel(s) 10, connecting the elements can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, this disclosure is intended to include corresponding and complementary receiver-side functionality in both the same transceiver and/or another transceiver(s), and vice versa.

An exemplary aspect addresses at least the above issues by providing a new power control technique to meet or exceed the above requirements by introducing selectable finite power transmission states and power control algorithms to improve overall system performance, and take into consideration low cost and robustness for pathloss measurement errors.

As discussed above, some wireless communications environments, such as Wi-Fi, may include inexpensive power amplifiers where the power adjustment may not be accurate, and may also include pathloss measurement errors that are high enough to degrade performance of a power control algorithm. To address this issue, an exemplary aspect is directed toward a finite state power control algorithm and technique that, while designed for next generation Wi-Fi standards, such as 802.11ax, can in general be used with any wireless communication protocol or standard.

For example, new transmission power states can be defined, where 0 dBm is a low power transmission state, and 15 dBm is a high power transmission state. With these two states, the devices can select one suitable transmission power state by evaluating the environment and executing power control algorithms/techniques based on that evaluation.

In accordance with one exemplary embodiment, devices can exchange this power state information in a message, such as in a header of a packet or elsewhere in a packet. The power state can optionally be agreed upon, for example using standard ACK and NACK techniques, before the power state is utilized for communications.

In addition to the two states illustrated above, more transmission power states, such as four transmission power states, eight power transmission states, or even more, can be included in the finite state power control techniques discussed herein. Compared to conventional power control algorithm/techniques, an exemplary advantage of the techniques disclosed herein are that they do not require an accurate power adjustment and/or pathloss measurement.

Even more specifically, and compared to conventional power control techniques and algorithms, the solution disclosed herein at least meets the requirements of enabling use of a low cost power amplifier with inaccurate power adjustment, and a low cost system with inaccurate pathloss measurements.

One exemplary usage scenario is illustrated in accordance with FIG. 1. As illustrated in FIG. 1, which includes in a communication environment 100, an access point 120 (AP) and a plurality of stations (STA1-STA4) (104-116), a 2-state transmission power control technique is defined.

In State 1, a fixed low transmission power level is defined, such as 0 dBm, illustrated between the AP 120 and Station 4 116, and also illustrated between Station 2 108 and Station 3 112. A fixed high transmission power level is also defined as the maximum device transmission power, such as 15 dBm, which is shown between Station 1 104 and access point 120 and Station 2 108 and access point 120.

A native state is also defined to assist with implementation and algorithm design, with that state being State 0, where there is no transmission power and/or a scenario where no transmission is performed. Thus, in FIG. 1, three transmission power levels are defined as:

State 1: Fixed low transmission power level,
State 2: Fixed high transmission power level, and
State 0: No transmission power and/or no transmission.

As illustrated in FIG. 1, there are four Wi-Fi, or other comparable low cost wireless broadband communication systems (STA1-STA4). For the connection between STA1 104 to/from the access point 120, and for STA2 108 to/from the access point 120, due to the long distance with large channel propagation loss, State 2 was selected by the power control scheme (as described herein) to support the transmission of this type of communication connection or link. For the connections between STA2 108 to/from STA3 112 and from STA4 116 to/from the access point 120, due to the short distance with small channel propagation loss between the devices, State 1 was selected by the power control scheme (as described herein) to support the transmission over this type of link. When there is no transmission in each link, State 0, being no transmission power, is assigned.

Figure 3:
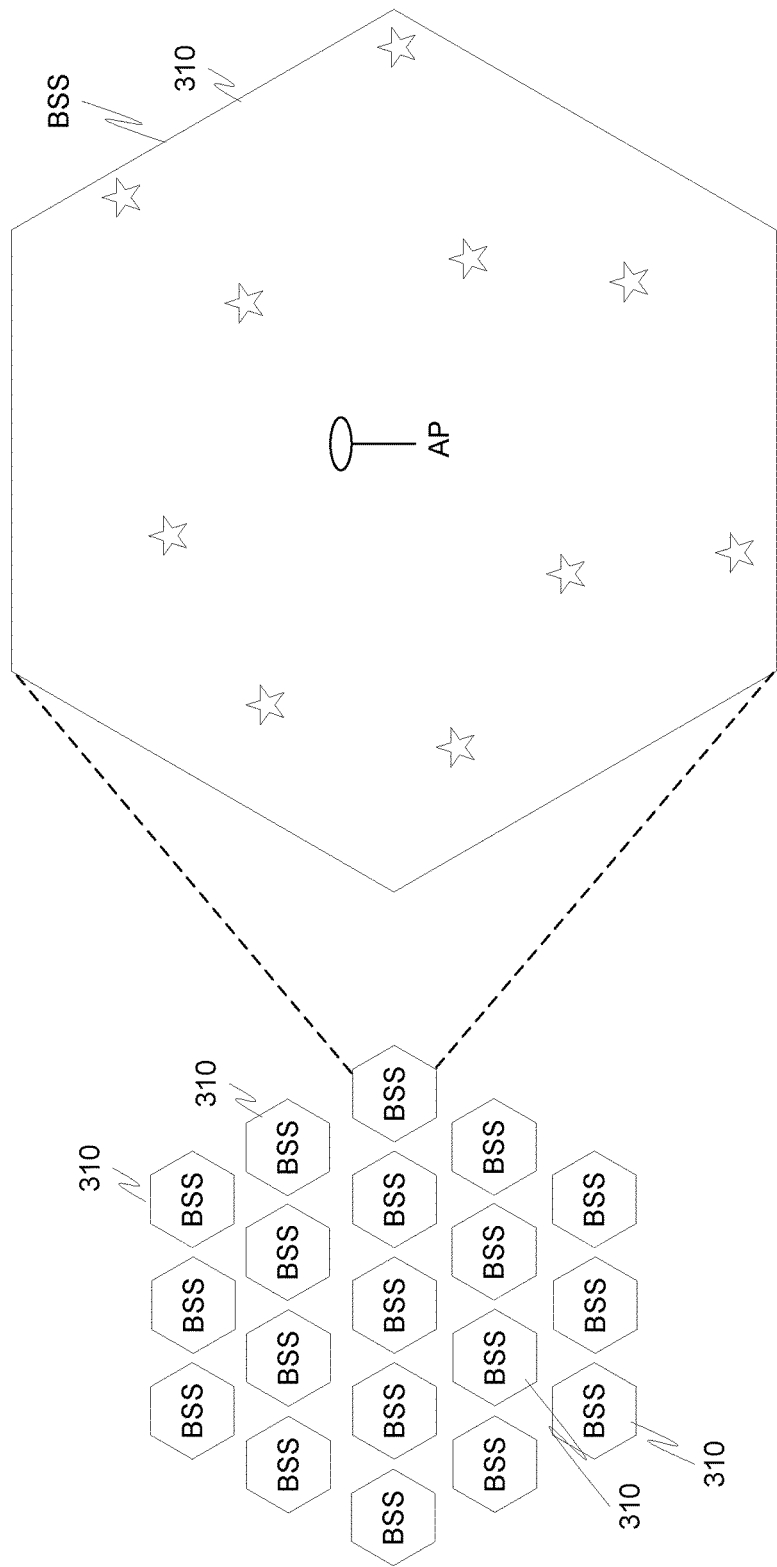
FIG. 3 illustrates an exemplary test environment.

An evaluation scenario was arbitrarily selected from the IEEE 802.11ax evaluation documentation as illustrated in FIG. 3 to test the techniques proposed herein. In the scenario 3 environment in FIG. 3, evaluation was performed on an indoor small BSS (Basic Service Set) hotspot. As for the topology in FIG. 3, there are dense small BSS's 310 that are uniform, with approximately 10-20 meters inter-AP distance with approximately hundreds of stations/APs, and P2P pairs. Scenario 3 is a managed environment with an indoor channel model, flat homogeneity, and both enterprise and mobile traffic modelling.

In Scenario 3 in the 802.11ax planning meetings, this indoor small BSS Hotspot (dense) scenario has the objective to capture the issues and be representative of real-world deployments with a high density of APs and STAs. In such environments, the infrastructure network (ESS) is planned. For simulation complexity simplifications, a hexagonal cell layout is considered with a frequency reuse pattern. This frequency reuse pattern is defined and fixed, as part of the parameters that can't be modified in this scenario. (Note that BSS channel allocation can be evaluated in simulation scenarios where there are is not a planned network (ESS), as in the residential one.) In such environments, the "traffic condition" described in the usage model document mentions:

i. Interference between APs belonging to the same managed ESS due to high density deployment: this OBSS (Overlapping Basic Service Set) interference is captured in this scenario (note that this OBSS interference is touching STAs in high SNR conditions (close to their serving APs, while in outdoor large BSS scenarios, the OBSS interference will be touching STAs in low SNR conditions (for from their serving APs));

iii. Interference with unmanaged networks (P2P links): this OBSS interference is captured in this scenario by the definition of interfering networks, defined here as random unmanaged short-range P2P links, representative of Soft APs and tethering;

iv. Interference with unmanaged stand-alone APs: this OBSS interference is currently not captured in this scenario, but in the hierarchical indoor/outdoor scenario; and v. Interference between APs belonging to different managed ESS due to the presence of multiple operators: this OBSS interference is currently not captured in this scenario, but in the outdoor large BSS scenario.

Other important real-world conditions representative of such environments are also captured in this scenario that include existence of unassociated clients, with regular probe request broadcasts.

In order to focus this scenario on the issues related to high density, the channel model is considered as a large indoor model.

Some details of key evaluation parameters for scenario 3 are:

| Evaluation Parameter | Value |
| --- | --- |
| Layout | Indoor Small BSSs Scenario 3 (Reuse 3) |
| Inter-Cell-Distance | 30 meters |
| Channel Models | 2.45 Ghz, IMT-Adv* Indoor hotspot, LoS channel |
| Max Tx Power | 15 dBm/15 dBm for AP/STA |
| Tx/Rx Antenna | 1 as initial setting |
| STA Distribution | 10 STAs per BSS with uniform distribution |
| Bandwidth | 20 Mhz channel; |
| Scheduling | CCA based channel access |

*International Mobile Telecommunications-Advanced

For pathloss measurement error evaluation, an exemplary error model can be built as follows:

$$L_{error} = L_{error\_fixed} + L_{error\_dynamic}$$

where $L_{error\_fixed}$ is:
a value with uniform distribution between [−MaxFixedError, +MaxFixedError], where MaxFixedError is a parameter set for study, such as 0 dB, 5 dB, 10 dB, etc.,
The offset value of each STA can be generated at the simulation start stage and then fixed for the simulation, and $L_{error\_dynamic}$ is:
a value with uniform distribution between [-MaxDynamicError, +MaxDynamicError], where MaxDynamicError is a parameter set for study, such as 0 dB, 5 dB, 10 dB, etc,
The offset value of each STA can be generated at each time of usage for each link.

Through the previous evaluation results analysis, it can observed that fixed pathloss error $L_{error\_fixed}$ would not contribute significantly to impacts on performance, so, as a result, attention can be focused on the impact of dynamic pathloss in the design of the solution.

TABLE 1

Summary of Evaluation Results

| | MaxDyanmicError = 0 dB STA Mean (Mbps) | | MaxDyanmicError = 5 dB STA Mean (Mbps) | | MaxDyanmicError = 10 dB STA Mean (Mbps) | |
|---|---|---|---|---|---|---|
| | DL* | UL* | DL | UL | DL | UL |
| Baseline** | 0.1732 | 0.1818 | | | | |
| 2-State | 0.2656 | 0.3264 | 0.2101 | 0.3340 | 0.1260 | 0.2759 |
| 4-States | 0.4193 | 0.4700 | 0.3548 | 0.3753 | 0.1759 | 0.2532 |
| 8-States | 0.4512 | 0.4577 | 0.3531 | 0.3824 | 0.2092 | 0.2692 |
| 16-States | 0.5321 | 0.5120 | 0.4041 | 0.4178 | 0.2274 | 0.2741 |
| 4-States vs. Baseline | 250.51% | | 205.66% | | 120.8% | |
| 4-States vs. 16-States | 85.17% | | 88.83% | | 85.56% | |

*DL = Downlink, UL = Uplink
**No Power Control

Through evaluation of the above results, one can observe two merits of the techniques disclosed herein:
 1) By using the solution defined herein with finite states of transmission power, such as 4 states, one can achieve almost the same benefits from transmission power control as those found in very accurate adjustment steps, such as 16 states with one dB per step,
 2) The solution is also very robust for pathloss dynamic measurement error, (Note that pathloss measurement dynamic error less than 5 dB will not significantly reduce the relative gain from power control versus the conventional methodology).

These two exemplary advantages are very suitable, for example, in a low cost wireless broadband communication system and/or standard, such as 802.11, and in particular, IEEE 802.11ax—slated to be the next generation Wi-Fi standard.

Figure 2:
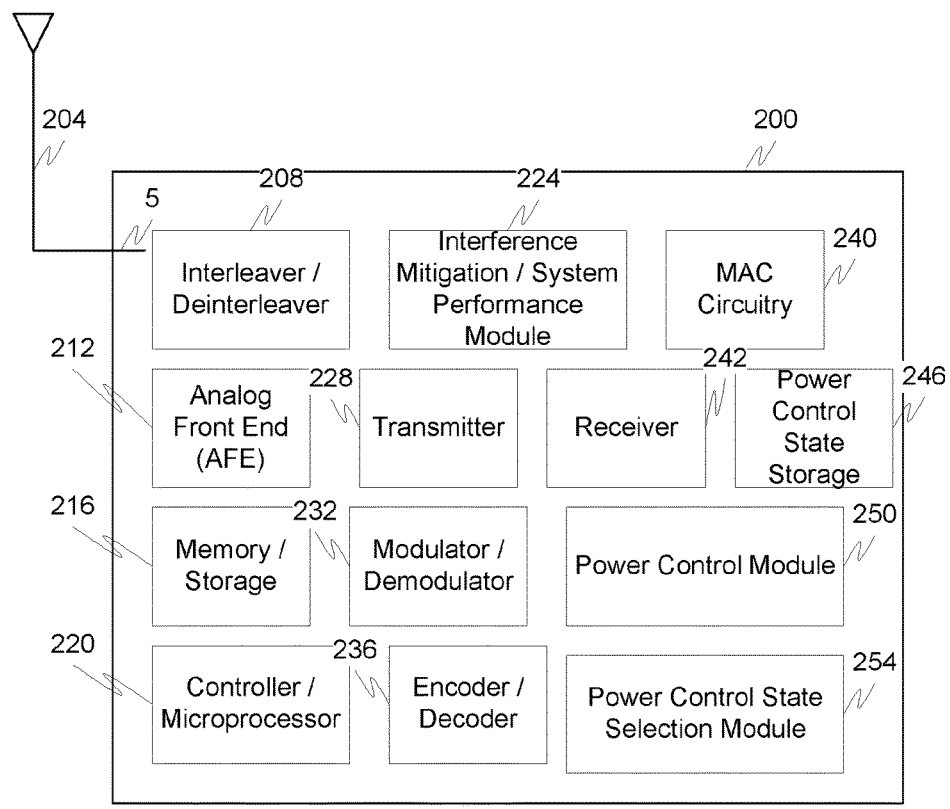
FIG. 2 illustrates an exemplary transceiver.

FIG. 2 illustrates an exemplary transceiver, such as that found in a station or an access point adapted to implement the techniques herein. In addition to well-known componentry (which has been omitted for clarity), the transceiver 200 includes one or more antennas 204, an interleaver/deinterleaver 208, an analog front end 212, memory/storage 216, controller/microprocessor 220, interference mitigation/system performance module 224, transmitter 228, modulator/demodulator 232, encoder/decoder 236, MAC Circuitry 240, receiver 242, power control state storage 246, power control module 250 and the power control state selection module 254. The various elements in the transceiver 200 are connected by one or more links (not shown again for sake of clarity). Also, while the memory/storage 216 and power control state storage 246 are shown separately, it should be appreciated that these elements could be combined. The transceiver 200 could also include, for example, a host or application processor, a user interface(s), power supply(ies), a non-transitory storage medium to store one or more applications, and optionally one or more radios such as a cellular radio/Bluetooth®/Bluetooth® low energy radio. The transceiver 200 (as well as access point 120) can have one more antennas 204, for use in wireless communications such as multi-input multi-output (MIMO) communications, Bluetooth®, etc. The antennas 204 can include, but are not limited to directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

In addition to well-known operational steps, the interference mitigation/system performance module 224, in cooperation with the power control module 250, the controller 220 and memory 216 determine a suitable transmission power level for the purposes of interference mitigation and improving system performance. As will be appreciated, this can be a front-end process and in general can use any power control algorithm that is compatible with the systems described herein.

As an example, three alternative power control algorithms that can work with the systems and methods disclosed herein include a first algorithm that is a SINR (Signal-to-Interference-plus-Noise Ratio) based power control algorithm, a second power control algorithm that is an SNR (Signal-to-Noise Ratio) based power control algorithm and a third power control algorithm described in related application PCT/CN2014/086532.

For the first exemplary power control algorithm, which is the SINR based power control algorithm, the algorithm outputs $P_{tx}^{dBm}$ which is the decided transmission power level for achieving a target signal-to-inference-plus-noise-ratio.

In the second power control algorithm, which is the SNR based power control algorithm, this algorithm is based on a target SNR value, and is the white noise power level with all other parameters being the same as the first alternative discussed above.

More specifically:
 Alternative #1: (SINR Based Power Control Algorithm)

$$P_{tx}^{dBm} = L + SINR_{Target} + NI$$

Where,
 $SINR_{Target}$ is the target SINR value (expressed as dB) to be achieved by the transmission power level,
 L is an estimated pahtloss value (expressed as dB) from transmitter to receiver at the time of transmission,
 NI is the estimated noise and interference power level (express as dBm) on the receiver side, and
 $P_{tx}^{dBm}$ is the decided transmission power level output by the algorithm for achieving the target SINR.
 Alternative #2: (SNR Based Power Control Algorithm)

$$P_{tx}^{dBm} = L + SNR_{Target} + N$$

Where,
 $SNR_{Target}$ is the target SNR value (expressed as dB) to be achieved by the transmission power level, and N is the white noise power level (express as dBm) at the receiver side, with all other parameters being the same as in alternative #1 above.

For the third power control algorithm, as described in related application PCT/CN2014/086532, where a master pair and a slave pair have been established, the maximum allowed transmission power in Tx/Rx sides of a slave candidate pair are:

$$P_{st}^{dBm} = \min(T_{mt}^{dBm} + h_{mt\text{-}st}^{dB}, T_{mr}^{dBm} + h_{mr\text{-}st}^{dB})$$

$$P_{sr}^{dBm} = \min(T_{mt}^{dBm} + h_{mt\text{-}sr}^{dB}, T_{mr}^{dBm} + h_{mr\text{-}sr}^{dB})$$

Where, $P_{st}^{dBm}$ is the maximum allowed transmission power on a Tx side of the slave candidate pair, expressed as dBm;

$P_{sr}^{dBm}$ is the maximum allowed transmission power on a Rx side of the slave candidate pair, expressed as dBm;

$T_{mt}^{dBm}$ is the maximum allowed interference threshold on a Tx side of the master pair, expressed as dBm;

$T_{mr}^{dBm}$ is the maximum allowed transmission power on a Rx side of the master pair, expressed as dBm; and $h_{xx\text{-}yy}^{dB}$ is the propagation loss between 2 Wi-Fi devices.

Once the transmission power level has been decided by one of the above power control algorithms as $P_{tx}^{dBm}$, one can assume N total transmission power states as defined by $P_{state}(i)$, i=1~N. In addition, there is one no transmission power state, as discussed above, defined as $P_{state}(0)$.

With the transmission power level having been decided in cooperation with the power control module 250, interference mitigation module 224, controller 220 and memory 216, the transceiver 200 next performs a power control state selection process based on, for example, one of the following alternatives.

Alternative #1: ($P_{tx}^{dBm}$ determined as a transmission power limitation)

This first option for determining the finite power control state selection is based on a transmission power limitation formulation. More specifically, an exemplary algorithm that performs its functionality is represented utilizing the following simple pseudo-code:

```
for i = N to 0
    if P_state(i) < p_tx^dBm
        then state i is selected;
        break;
    end
end
```

By using this simple code loop, the algorithm will select the one state that is the highest transmission power level within the transmission power level decided by the power control algorithm selected above.

Alternative #2: ($P_{tx}^{dBm}$ determined as approaching target power level)

In the second alternative, which is based on approaching a target power level, the algorithm can be described again in conjunction with the following pseudo-code example:

for i=0 to N absoluteDistance($i$)=abs($P_{state}(i) - P_{tx}^{dBm}$)

end

State i is selected from the index of the minimum value in absoluteDistance(i).

By using this simple code loop, the technique will select the one state that is the closest transmission power level compared to the transmission power level decided by the power control algorithm selected above. Upon selection of this state, the power control state selection module 254 stores, in the power control state storage 246, an indication of the power control state that will be utilized. This power control state will be used by various other transceiver components, such as the transmitter 228, when communicating information to one or more other wireless devices.

As discussed, an exemplary embodiment provides an excellent mechanism for performance gain with robustness from pathloss measurement dynamic error. With some of the exemplary performance benefits, lower cost devices can be produced but enjoy wide adoption for high-speed wireless LAN applications such as, for example, Wi-Fi, Wi-Di, (wireless display), D2D (Device-2-Device) communications, and the like, as discussed herein.

Figure 4:
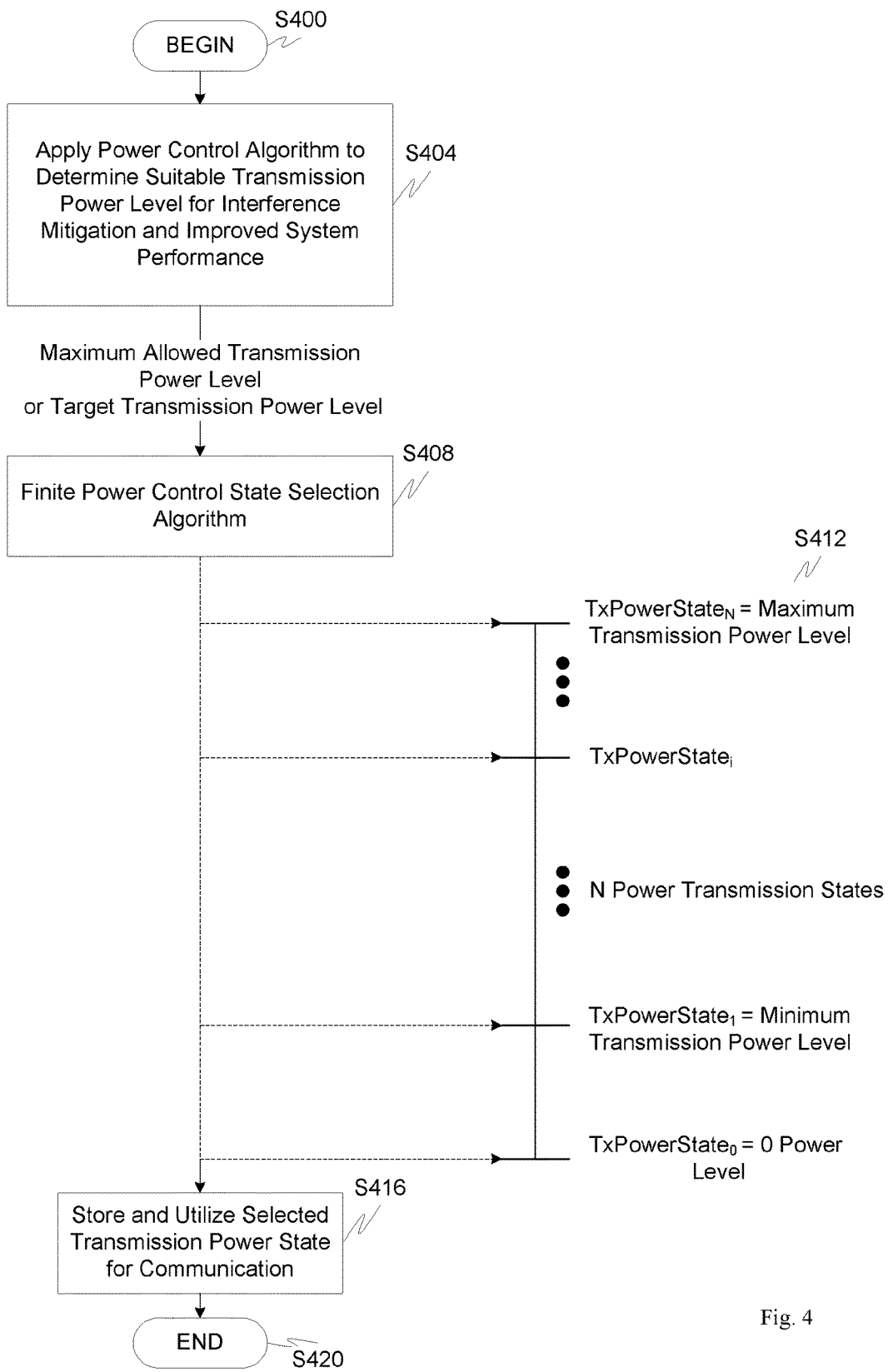
FIG. 4 is a flowchart illustrating an exemplary power control state technique.

FIG. 4 outlines an exemplary methodology that outlines power control in a transceiver. In particular, control begins in step S400 and continues to step S404. In step S404, a power control algorithm is applied to determine a suitable transmission power level that accomplishes interference mitigation and improves system performance. As shown above, there are several exemplary power control techniques that can be used with the systems described herein.

As a result of using one of these exemplary processes, a maximum allowed transmission power level or target transmission power level is determined. Next, in step S408, a finite power control state selection algorithm determines one or more transmission power states, which can then be stored in memory. As an example, there can be a plurality of transmission power states ranging from a 0 power level, as illustrated in step S412, up to a maximum transmission power level, with one or more intervening power levels as illustrated in FIG. 4. These various power levels will be referred to as power transmission states, with the system capable of storing an indication of one or more of these power transmission states in memory. As will be appreciated, these power transmission states can be identified by one or more identifiers, and can be stored in, for example, table form, in a field, in a database, in a schema, and the like. These power transmission states and/or the corresponding identifiers can also be shared with one or more other devices.

Next, in step S416, the selected transmission power state is stored and utilized for communications. Control then continues to step S420 where the control sequence ends.

Aspects are thus directed toward:

1. A system comprising:

an interference mitigation module adapted to determine a maximum allowed transmission power level or a target transmission power level;

a power control module adapted to select a transmission power level; and a power control state selection module adapted to determine a number of total transmission power states for a transceiver based on the transmission power level.

2. The system of aspect 1, wherein the target transmission power level is determined based on a Signal-to-Interference-plus-Noise Ratio (SINR) power control algorithm which is based on a target Signal-to-Interference-plus-Noise Ratio value, an estimated pathloss value and an estimated noise and interference power level.

3. The system of aspect 1, wherein the target transmission power level is determined based on a Signal-to-Noise Ratio (SNR) power control algorithm which is based on an estimated pathloss value, a target SNR value and a white noise power level.

4. The system of aspect 1, wherein the number of total transmission power states for the transceiver is based on a transmission power limitation where one state is selected that is a highest transmission power level within the transmission power level.

5. The system of aspect 1, wherein the number of total transmission power states for the transceiver is based on approaching a target level.

6. The system of aspect 1, wherein the transceiver utilizes a transmission power state for transmission.

7. The system of aspect 6, wherein the transmission power state is determined each time a link is utilized.

8. The system of aspect 1, wherein performance gain is improved while maintaining robustness from pathloss measurement dynamic error.

9. The system of aspect 1, further comprising storage adapted to store information about each of the transmission power states.

10. A method comprising:
   determining a maximum allowed transmission power level or a target transmission power level;
   selecting a transmission power level; and
   determining a number of total transmission power states for a transceiver based on the transmission power level.

11. The method of aspect 10, wherein the target transmission power level is determined based on a Signal-to-Interference-plus-Noise Ratio (SINR) power control algorithm which is based on a target Signal-to-Interference-plus-Noise Ratio value, an estimated pathloss value and an estimated noise and interference power level.

12. The method of aspect 10, wherein the target transmission power level is determined based on a Signal-to-Noise Ratio (SNR) power control algorithm which is based on an estimated pathloss value, a target SNR value and a white noise power level.

13. The method of aspect 10, wherein the number of total transmission power states for the transceiver is based on a transmission power limitation where one state is selected that is a highest transmission power level within the transmission power level.

14. The method of aspect 10, wherein the number of total transmission power states for the transceiver is based on approaching a target level.

15. The method of aspect 10, wherein the transceiver utilizes a transmission power state for transmission.

16. The method of aspect 15, wherein the transmission power state is determined each time a link is utilized.

17. The method of aspect 10, wherein performance gain is improved while maintaining robustness from pathloss measurement dynamic error.

18. The method of aspect 10, further comprising storing information about each of the transmission power states.

19. A system comprising: means for determining a maximum allowed transmission power level or a target transmission power level;
   means for selecting a transmission power level; and
   means for determining a number of total transmission power states for a transceiver based on the transmission power level.

20. The system of aspect 19, wherein the target transmission power level is determined based on a Signal-to-Interference-plus-Noise Ratio (SINR) power control algorithm which is based on a target Signal-to-Interference-plus-Noise Ratio value, an estimated pathloss value and an estimated noise and interference power level.

21. The system of aspect 19, wherein the target transmission power level is determined based on a Signal-to-Noise Ratio (SNR) power control algorithm which is based on an estimated pathloss value, a target SNR value and a white noise power level.

22. The system of aspect 19, wherein the number of total transmission power states for the transceiver is based on a transmission power limitation where one state is selected that is a highest transmission power level within the transmission power level.

23. The system of aspect 19, wherein the number of total transmission power states for the transceiver is based on approaching a target level.

24. The system of aspect 19, wherein the transceiver utilizes a transmission power state for transmission.

25. The system of aspect 24, wherein the transmission power state is determined each time a link is utilized.

26. A non-transitory computer-readable information storage media having stored thereon instruction, that when executed, perform a method comprising:
   determining a maximum allowed transmission power level or a target transmission power level;
   selecting a transmission power level; and
   determining a number of total transmission power states for a transceiver based on the transmission power level.

27. The media of aspect 26, wherein the target transmission power level is determined based on a Signal-to-Interference-plus-Noise Ratio (SINR) power control algorithm which is based on a target Signal-to-Interference-plus-Noise Ratio value, an estimated pathloss value and an estimated noise and interference power level.

28. The media of aspect 26, wherein the target transmission power level is determined based on a Signal-to-Noise Ratio (SNR) power control algorithm which is based on an estimated pathloss value, a target SNR value and a white noise power level.

29. The media of aspect 26, wherein the number of total transmission power states for the transceiver is based on a transmission power limitation where one state is selected that is a highest transmission power level within the transmission power level.

30. The media of aspect 26, wherein the number of total transmission power states for the transceiver is based on approaching a target level.

31. The media of aspect 26, wherein the transceiver utilizes a transmission power state for transmission.

32. The media of aspect 31, wherein the transmission power state is determined each time a link is utilized.

33. The media of aspect 26, wherein performance gain is improved while maintaining robustness from pathloss measurement dynamic error.

34. The media of aspect 26, further comprising storing information about each of the transmission power states.

The exemplary embodiments are described in relation to finite power transmission states in a wireless transceiver. However, it should be appreciated, that in general, the systems and methods herein will work equally well for any type of communication system in any environment utilizing any one or more protocols including wired communications, wireless communications, powerline communications, coaxial cable communications, fiber optic communications and the like.

The exemplary systems and methods are described in relation to 802.11 transceivers and associated communication hardware, software and communication channels. However, to avoid unnecessarily obscuring the present disclosure, the following description omits well-known structures and devices that may be shown in block diagram form or otherwise summarized.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s) 10, connecting the elements (which may not be shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an 802.11 transceiver, or the like. Examples of wireless protocols that can be used with this technology include 802.11a, 802.11b, 802.11g, 802.11n, 802.11ac, 802.11ad, 802.11af, 802.11ah, 802.11ai, 802.11aj, 802.11aq, 802.11ax, WiFi, LTE, 4G, Bluetooth®, WirelessHD, WiGig, WiGi, 3GPP, Wireless LAN, WiMAX, and the like.

The term transceiver as used herein can refer to any device that comprises hardware, software, circuitry, firmware, or any combination thereof and is capable of performing any of the methods, techniques and/or algorithms described herein.

Additionally, the systems, methods and protocols can be implemented on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA.® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there has been provided systems and methods for providing finite power transmission states in a wireless communications environment. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A system comprising:
an interference mitigation module to determine a target transmission power level, wherein the target transmission power level is determined based on:
a Signal-to-Interference-plus-Noise Ratio (SINR) power control algorithm which is based on a target Signal-to-Interference-plus-Noise Ratio value, an estimated pathloss value and an estimated noise and interference power level, or
a Signal-to-Noise Ratio (SNR) power control algorithm which is based on an estimated pathloss value, a target SNR value and a white noise power level;
a power control module to select a transmission power level; and
a power control state selection module to determine a number of total transmission power states for a transceiver based on the transmission power level.

2. The system of claim 1, wherein the interference mitigation module further determines a maximum allowed transmission power level.

3. The system of claim 1, wherein the number of total transmission power states for the transceiver is based on a transmission power limitation where one state is selected that is a highest transmission power level within the transmission power level.

4. The system of claim 1, wherein the number of total transmission power states for the transceiver is based on approaching a target power level.

5. The system of claim 1, wherein the transceiver utilizes a transmission power state for transmission.

6. The system of claim 5, wherein the transmission power state is determined each time a link is utilized.

7. The system of claim 1, wherein performance gain is improved while maintaining robustness from pathloss measurement dynamic error.

8. The system of claim 1, further comprising storage adapted to store information about each of the transmission power states.

9. A method comprising:
determining a target transmission power level, wherein the target transmission power level is determined based on:
a Signal-to-Interference-plus-Noise Ratio (SINR) power control algorithm which is based on a target Signal-to-Interference-plus-Noise Ratio value, an estimated pathloss value and an estimated noise and interference power level, or
a Signal-to-Noise Ratio (SNR) power control algorithm which is based on an estimated pathloss value, a target SNR value and a white noise power level;
selecting a transmission power level; and
determining a number of total transmission power states for a transceiver based on the transmission power level.

10. The method of claim 9, further comprising determining a maximum allowed transmission power level.

11. The method of claim 9, wherein the number of total transmission power states for the transceiver is based on a transmission power limitation where one state is selected that is a highest transmission power level within the transmission power level.

12. The method of claim 9, wherein the number of total transmission power states for the transceiver is based on approaching a target power level.

13. The method of claim 9, wherein the transceiver utilizes a transmission power state for transmission.

14. The method of claim 13, wherein the transmission power state is determined each time a link is utilized.

15. The method of claim 9, wherein performance gain is improved while maintaining robustness from pathloss measurement dynamic error.

16. The method of claim 9, further comprising storing information about each of the transmission power states.

17. A system comprising:
means for determining a target transmission power level, wherein the target transmission power level is determined based on:
a Signal-to-Interference-plus-Noise Ratio (SINR) power control algorithm which is based on a target Signal-to-Interference-plus-Noise Ratio value, an estimated pathloss value and an estimated noise and interference power level, or
a Signal-to-Noise Ratio (SNR) power control algorithm which is based on an estimated pathloss value, a target SNR value and a white noise power level;
means for selecting a transmission power level; and
means for determining a number of total transmission power states for a transceiver based on the transmission power level.

18. The system of claim 17, wherein the number of total transmission power states for the transceiver is based on a transmission power limitation where one state is selected that is a highest transmission power level within the transmission power level.

19. The system of claim 17, wherein the number of total transmission power states for the transceiver is based on approaching a target power level.

20. The system of claim 17, wherein the transceiver utilizes a transmission power state for transmission.

21. The system of claim 20, wherein the transmission power state is determined each time a link is utilized.

22. A non-transitory computer readable information storage media having stored thereon instructions, that when executed by one or more processors, cause to be performed a method comprising:
determining a target transmission power level, wherein the target transmission power level is determined based on:
a Signal-to-Interference-plus-Noise Ratio (SINR) power control algorithm which is based on a target Signal-to-Interference-plus-Noise Ratio value, an estimated pathloss value and an estimated noise and interference power level, or
a Signal-to-Noise Ratio (SNR) power control algorithm which is based on an estimated pathloss value, a target SNR value and a white noise power level;
selecting a transmission power level; and
determining a number of total transmission power states for a transceiver based on the transmission power level.

* * * * *